US011799305B2

(12) United States Patent
Truettner et al.

(10) Patent No.: US 11,799,305 B2
(45) Date of Patent: Oct. 24, 2023

(54) MODULAR BATTERY PACK CHARGING SYSTEM AND METHOD OF OPERATING THE SAME

(71) Applicant: MILWAUKEE ELECTRIC TOOL CORPORATION, Brookfield, WI (US)

(72) Inventors: Donald J. Truettner, Waukesha, WI (US); Babacar J. Diop, New Berlin, WI (US); Kyle C. Fassbender, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 165 days.

(21) Appl. No.: 17/094,260

(22) Filed: Nov. 10, 2020

(65) Prior Publication Data

US 2021/0143655 A1    May 13, 2021

Related U.S. Application Data

(60) Provisional application No. 62/934,626, filed on Nov. 13, 2019.

(51) Int. Cl.
*H02J 7/00*        (2006.01)
(52) U.S. Cl.
CPC ........ *H02J 7/0045* (2013.01); *H02J 7/00045* (2020.01); *H02J 7/00047* (2020.01); *H02J 7/0047* (2013.01)
(58) Field of Classification Search
CPC ....................................................... H02J 7/00
See application file for complete search history.

(56) References Cited

U.S. PATENT DOCUMENTS

| 4,739,242 | A | 4/1988 | McCarty et al. |
| 2010/0264874 | A1 | 10/2010 | Murtha et al. |
| 2014/0266048 | A1* | 9/2014 | Cunanan ............... H02J 7/0045 320/112 |

(Continued)

FOREIGN PATENT DOCUMENTS

| JP | 2011217513 A | 10/2011 |
| KR | 200484178 Y1 | 8/2017 |

OTHER PUBLICATIONS

International Search Report and Written Opinion for Application No. PCT/US2020/059824 dated May 13, 2021 (10 pages).

*Primary Examiner* — Robert Grant
(74) *Attorney, Agent, or Firm* — Michael Best & Friedrich LLP (57) ABSTRACT

A system for charging a rechargeable power tool battery pack. The system includes a housing having a first port, a second port, and a power bus. The first port is configured to receive at least one selected from a power supply and a charging module. The second port is configured to receive the other of the at least one selected from the power supply and the charging module. Wherein the power supply is configured to supply a charging voltage, and wherein the charging module includes a battery receptacle configured to receive the rechargeable power tool battery pack, the rechargeable power tool battery pack having a first battery characteristic. The power bus is within the housing. The power bus is configured to provide an electrical connection between the first port and the second port and distribute the charging voltage.

20 Claims, 7 Drawing Sheets

(56) References Cited

U.S. PATENT DOCUMENTS

| | | | |
|---|---|---|---|
| 2016/0099575 A1* | 4/2016 | Velderman | H02J 7/342 |
| | | | 320/113 |
| 2017/0063114 A1* | 3/2017 | Briere | B25H 3/02 |
| 2018/0006490 A1 | 1/2018 | Lei | |
| 2019/0020204 A1 | 1/2019 | Ehler et al. | |
| 2019/0067955 A1 | 2/2019 | Sergyeyenko et al. | |

* cited by examiner

MODULAR BATTERY PACK CHARGING SYSTEM AND METHOD OF OPERATING THE SAME

RELATED APPLICATIONS

This application claims the benefit of U.S. Provisional Patent Application No. 62/934,626, filed Nov. 13, 2019, the entire content of which is hereby incorporated by reference.

BACKGROUND

Embodiments relate to a modular battery charging system and methods of operating the same.

SUMMARY

Systems described herein provide for charging a rechargeable power tool battery pack. The system includes a housing having a first port, a second port, and a power bus. The first port is configured to receive a power supply or a charging module. The second port is configured to receive the other of the at least one selected from the power supply and the charging module. The power supply is configured to supply a charging voltage, and the charging module includes a battery receptacle configured to receive the rechargeable power tool battery pack. The rechargeable power tool battery pack includes a first battery characteristic. The power bus is within the housing. The power bus is configured to provide an electrical connection between the first port and the second port and distribute the charging voltage.

Methods described herein provide for operating a charging system that includes a port configured to receive a charging module. The methods include outputting, via a first controller, a query to a second controller, and determining, based on the query to the second controller, that the charging module is received by the port. The method further includes determining, via the first controller, a rating of the charging module, and supplying power to the charging module according to the rating of the charging module.

Systems described herein provide for charging a plurality of battery packs. The systems include a housing, a plurality of charging modules configured to receive at least one of the plurality of battery packs, a power supply, a plurality of charging ports configured to receive at least one of the plurality of charging modules and the power supply, and a power bus configured to provide power from the power supply to the plurality of charging modules. At least one of the charging modules of the plurality of charging modules includes a first controller configured to control power from the power supply. The power supply includes a second controller configured to communicate with the first controller.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

The phrase "series-type configuration" as used herein refers to a circuit arrangement in which the described elements are arranged, in general, in a sequential fashion such that the output of one element is coupled to the input of another, though the same current may not pass through each element. For example, in a "series-type configuration," additional circuit elements may be connected in parallel with one or more of the elements in the "series-type configuration." Furthermore, additional circuit elements can be connected at nodes in the series-type configuration such that branches in the circuit are present. Therefore, elements in a series-type configuration do not necessarily form a true "series circuit."

Additionally, the phrase "parallel-type configuration" as used herein refers to a circuit arrangement in which the described elements are arranged, in general, in a manner such that one element is connected to another element, such that the circuit forms a parallel branch of the circuit arrangement. In such a configuration, the individual elements of the circuit may not have the same potential difference across them individually. For example, in a parallel-type configuration of the circuit, two circuit elements in parallel with one another may be connected in series with one or more additional elements of the circuit. Therefore, a circuit in a "parallel-type configuration" can include elements that do not necessarily individually form a true "parallel circuit."

It should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

Other aspects of the application will become apparent by consideration of the description and accompanying drawings.

DETAILED DESCRIPTION

Embodiments described herein provide a system for charging a rechargeable power tool battery pack. The system includes a housing having a first port, a second port, and a power bus. The first port is configured to receive at least one selected from a power supply and a charging module. The second port is configured to receive the other of the at least one selected from the power supply and the charging module. Wherein the power supply is configured to supply a charging voltage, and wherein the charging module includes a battery receptacle configured to receive the rechargeable power tool battery pack, the rechargeable power tool battery pack having a first battery characteristic. The power bus is within the housing. The power bus is configured to provide an electrical connection between the first port and the second port and distribute the charging voltage.

Figure 1:
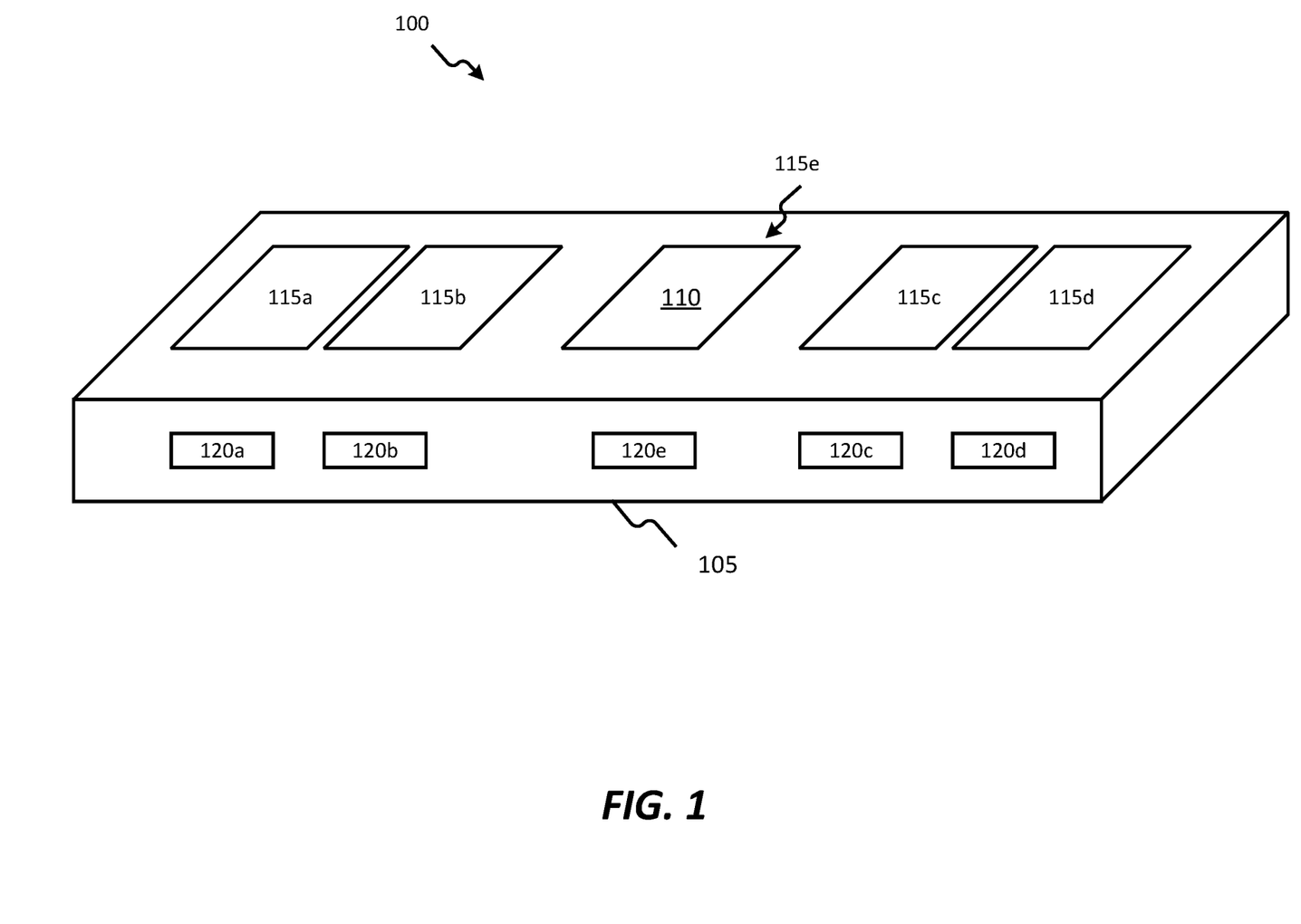
FIG. 1 is a perspective view of a charging system according to some embodiments.

FIG. 1 illustrates a charging system 100 according to some embodiments. The charging system 100 may include a housing 105 having one or more ports 115a-115e. The system 100 further includes a power supply 110. In the illustrated embodiment, the power supply 110 is received within port 115e, but may be received within any port 115a-115e. The housing 105 may further include one or more indicators 120a-120e.

Figure 2:
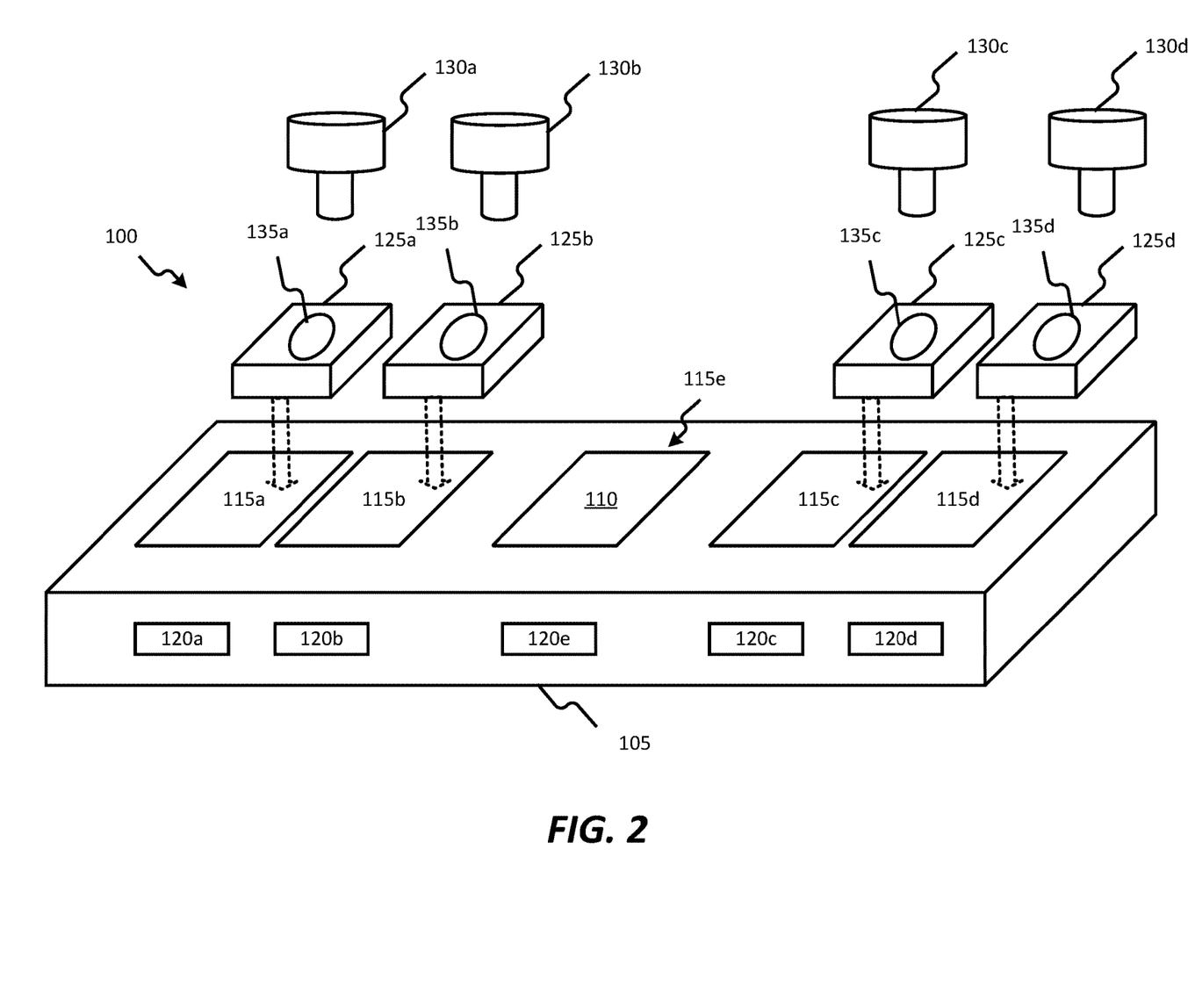
FIG. 2 is a perspective view of the charging system of FIG. 1 including one or more charging modules according to some embodiments.

As illustrated in FIG. 2, the ports 115a-115d are each configured to receive a charging module 125a-125d (or the power supply 110). Although illustrated as receiving a particular charging module (for example, port 115a receiving charging module 125a), each port 115a-115e may be configured to receive each charging module 125a-125d or the power supply 110. Each port 115a-115e may have electrical and/or communication terminals for electrically and/or communicatively coupling to a received charging module 125a-125d or the power supply 110. Additionally, each port 115a-115e may have mechanical components (for example, rails) to mechanically receive and/or secure a charging module 125a-125d or the power supply 110. In some embodiments, the housing 105 may include one or more mechanical features to ensure that the highest current consuming charging module is located proximate the power supply 110. Such an embodiment may minimize a voltage drop to the one or more charging modules 125a-125d.

The charging modules 125a-125d each may be configured to charge a battery pack (for example, battery packs 130a-130d) according to battery characteristics (for example, a battery type, a battery voltage, a battery capacity, etc.). In one exemplary embodiment, charging modules 125a, 125b may be configured to charge battery packs 130a, 130b, each having a voltage of approximately 18V, while charging modules 125c, 125d may be configured to charge battery packs 130c, 130d, each having a voltage of approximately 12V. Other embodiments may include more or less charging modules configured to charge battery packs having a voltage of approximately 18V, while yet other embodiments may include more or less charging modules configured to charge battery packs having a voltage of approximately 12V.

The charging modules 125a-125b may each include a battery receptacle 135a-135d configured to receive a battery pack 130a-130d. Battery packs 130a-130d may each include a battery pack housing containing one or more battery cells. The one or more battery cells may have a lithium-ion, or similar chemistry. The one or more battery cells may be electrically connected in a series-type configuration and/or a parallel-type configuration such that each battery pack 130a-130d provides a desired output voltage, a desired current output, and/or a desired power capacity. Each battery receptacle 135a-135d may have electrical and/or communication terminals for electrically and/or communicatively coupling to a battery pack 130a-130d. Additionally, each battery receptacle 135a-135d may have mechanical components (for example, rails) to mechanically receive and/or secure a battery pack 130a-130d. Although illustrated as a stem battery and stem battery receptacle, in other embodiments, the battery pack(s) may be a rail-type battery pack received by a rail-type battery receptacle.

Figure 3:
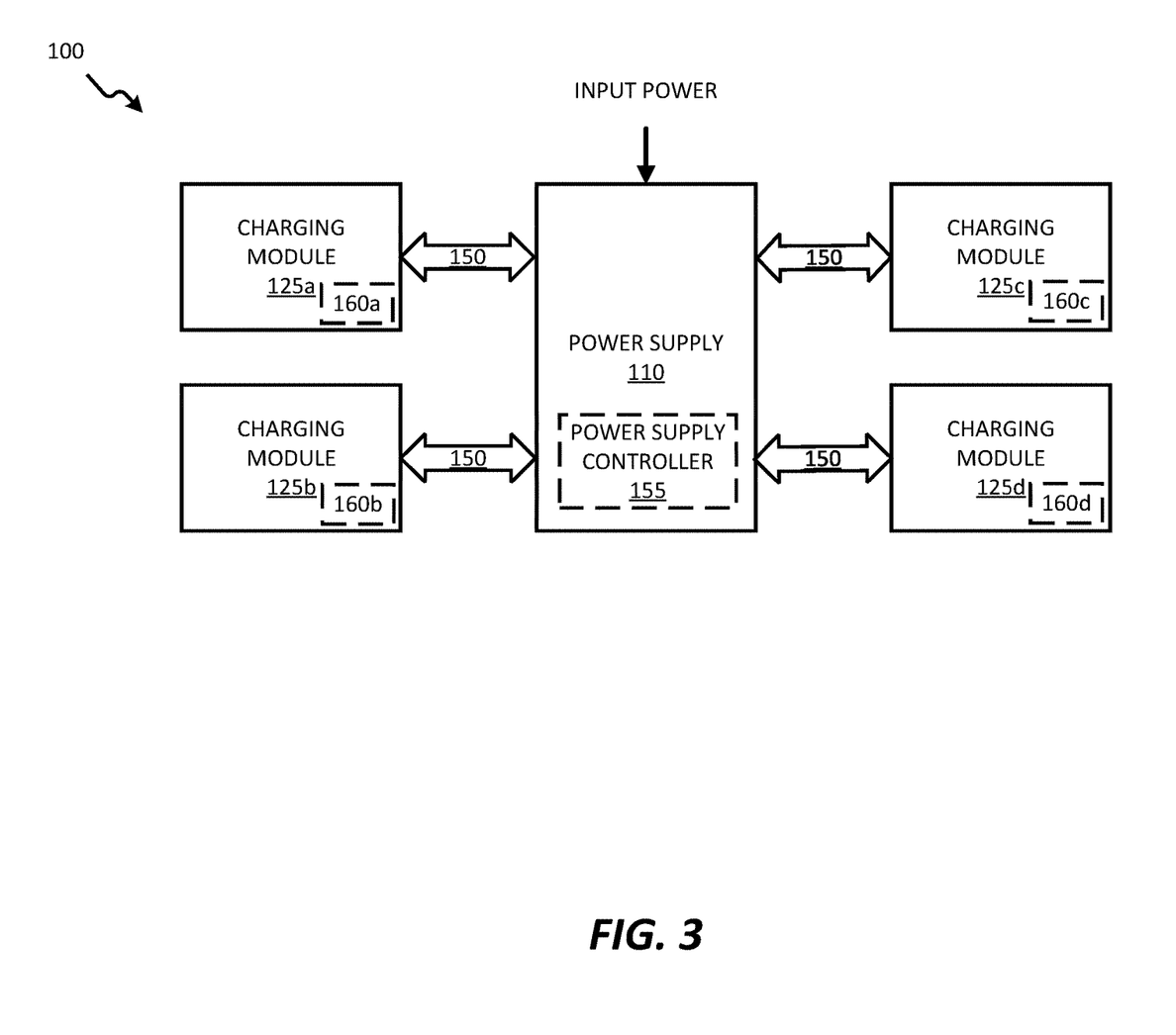
FIG. 3 is a block diagram of the charging system of FIG. 2 according to some embodiments.

FIG. 3 is a block diagram illustrating the charging system 100. The power supply 110 is configured to receive power (for example, AC line power or DC line power) and provide power (for example, low-voltage DC power) to the charging modules 125a-125d via a power bus 150. In some embodiments, the power bus 150 is contained within the housing 105 and electrically connects the ports.

As illustrated, in some embodiments, the power supply 110 includes a power supply controller 155. The power supply controller 155 may include an electronic processor and memory. The power supply controller 155 may be configured to monitor one or more characteristics (for example, current levels, voltage levels, power levels, and/or temperatures) of the power bus 150. In some embodiments, the bus power may be varied based on the monitored one or more characteristics. In some embodiments, the one or characteristics may be monitored to ensure the system 100 is operating with specified parameters. In some embodiments, the power supply 110 further includes an integrated cooling fan.

As illustrated, in some embodiments, the charging modules 125a-125d each include a charge controller 160a-160d. The charge controllers 160a-160d may each include an electronic processor and memory. The charge controllers 160a-160d may be configured to control charging of a battery pack, received by the charging module, according to specification. In some embodiments, the charge controllers 160a-160d are configured to communicate with the battery pack(s), (for example, via a proprietary communication scheme) to provide appropriate charging based on the needs of the battery pack(s).

In some embodiments, the system 100 uses an authentication process to authenticate a charging module received by a port. For example, in such an embodiment, a charge controller communicates with the power supply controller 155 to authenticate the respective charging module. Additionally, in some embodiments, the system 100 uses an authentication process to authenticate a power supply received by a port. For example, in such an embodiment, a power supply controller communicates with a charge controller to authenticate the power supply.

In some embodiments, the charging modules 125a-125d include a Universal Serial Bus (USB) port and/or a wireless charging apparatus in addition to, or in lieu of, the battery receptacles 135a-135d.

Returning to FIG. 1, in some embodiments, the indicators 120a-120e are configured to provide a charge status of a battery pack received by the respective charging module. In some embodiments, the indicators 120a-120e are controlled via the charge controllers 160a-160d (for example, the charge controller of the corresponding charge module received by the port). In some embodiments, the indicators 120a-120e are controlled via the power supply controller 155.

In some embodiments, charging system 100 includes a communication module. In some embodiments, the communication module is contained within housing 105. In other embodiments, the communication module is contained with power supply 110. In yet other embodiments, the communication module is contained with one or more charging modules 125.

The communication module may be configured to communication, via wired and/or wireless communication, to an external device (for example, a smartphone, a power tool, a computer, a tablet, etc.). In such an embodiment, the external device may receive information (for example, status information) related to the charging system 100 and/or one or more battery packs 130. The wireless communication may include, but is not limited to, Bluetooth communication, WiFi communication, and/or any other wireless communication protocol.

Figure 4:
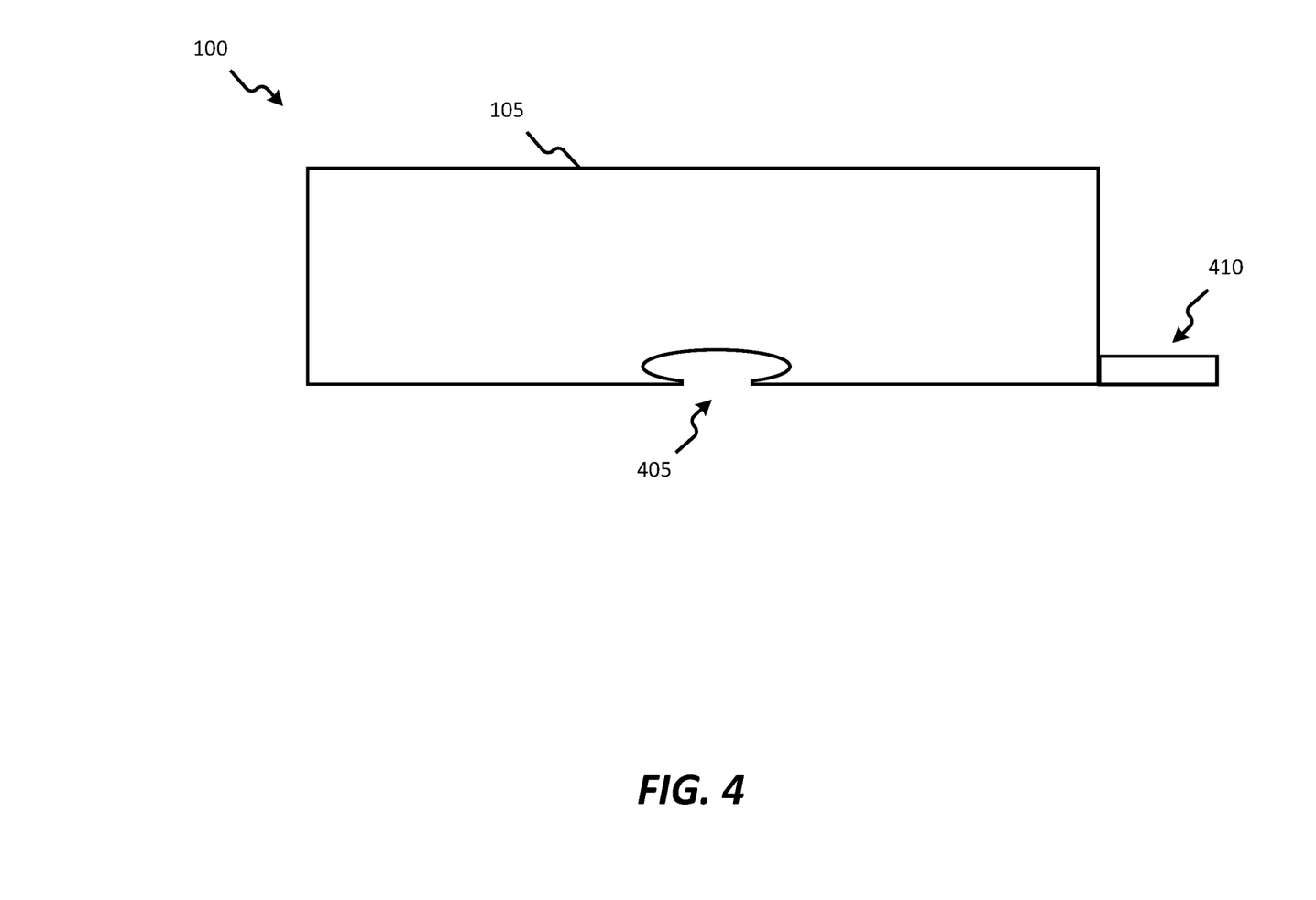
FIG. 4 is a side view of the charging system of FIG. 1 according to some embodiments.

FIG. 4 illustrates a side view of the charging system 100 according to some embodiments. As illustrated, the housing 105 may further include one or more mounting apparatus. For example, the housing 105 may include a rail mount 400 (for example, a DIN rail mount) (not shown) and/or a mounting tab 405.

Figure 5A:
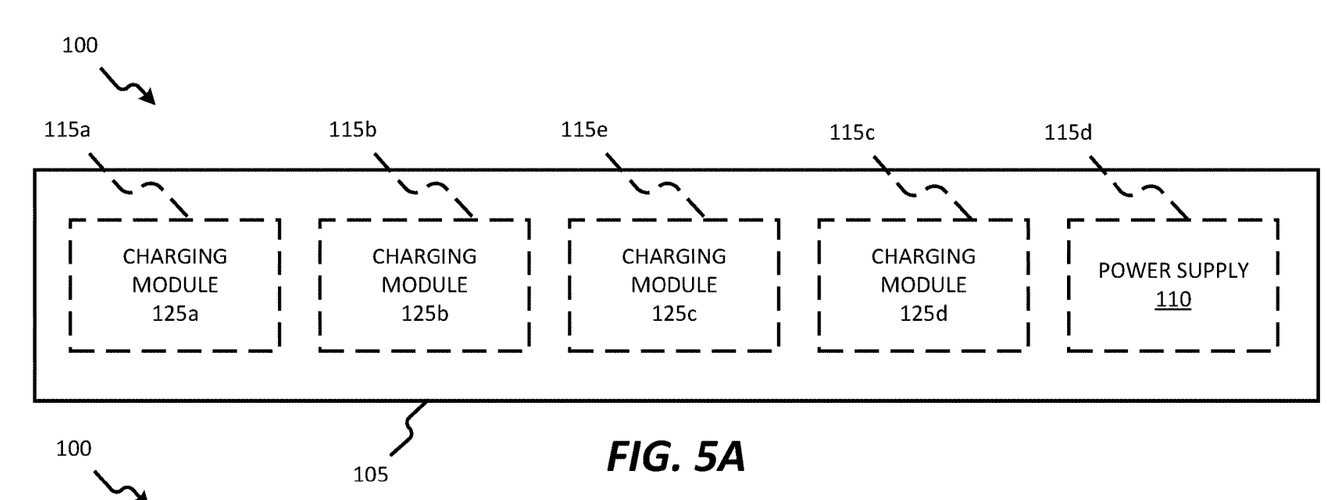
FIGS. 5A & 5B illustrate the charging system of FIG. 1 in different configurations according to some embodiments.
Figure 5B:
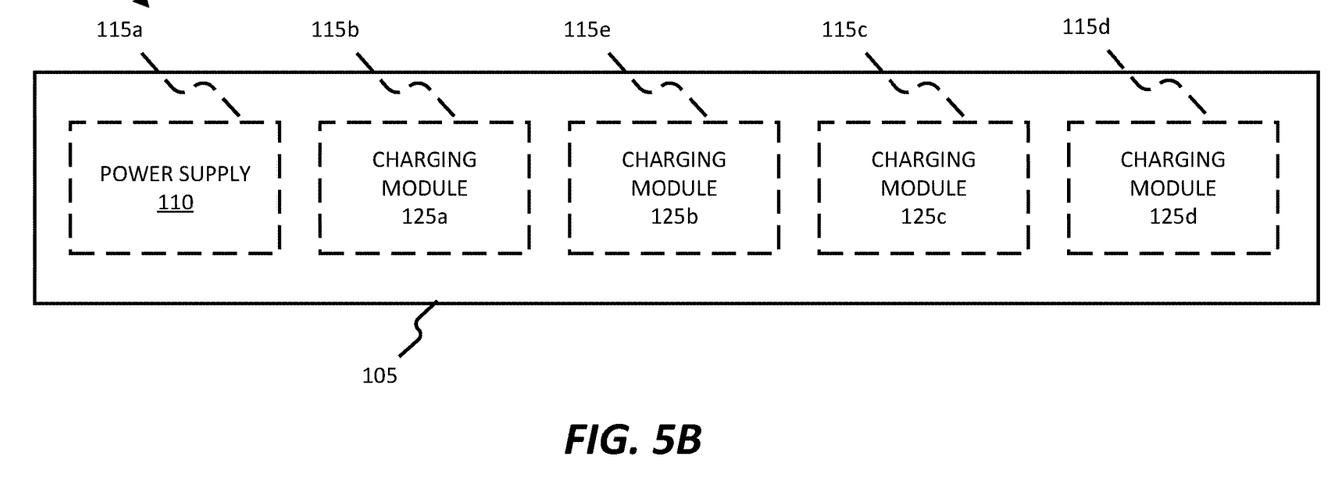

FIGS. 5A & 5B, illustrate various placements of the charging modules 125a-125d and the power supply 110. For example, FIGS. 1 and 2 illustrate a middle-orientation, while FIG. 5A illustrates a right hand orientation, and FIG. 5B illustrates a left hand orientation.

Figure 6:
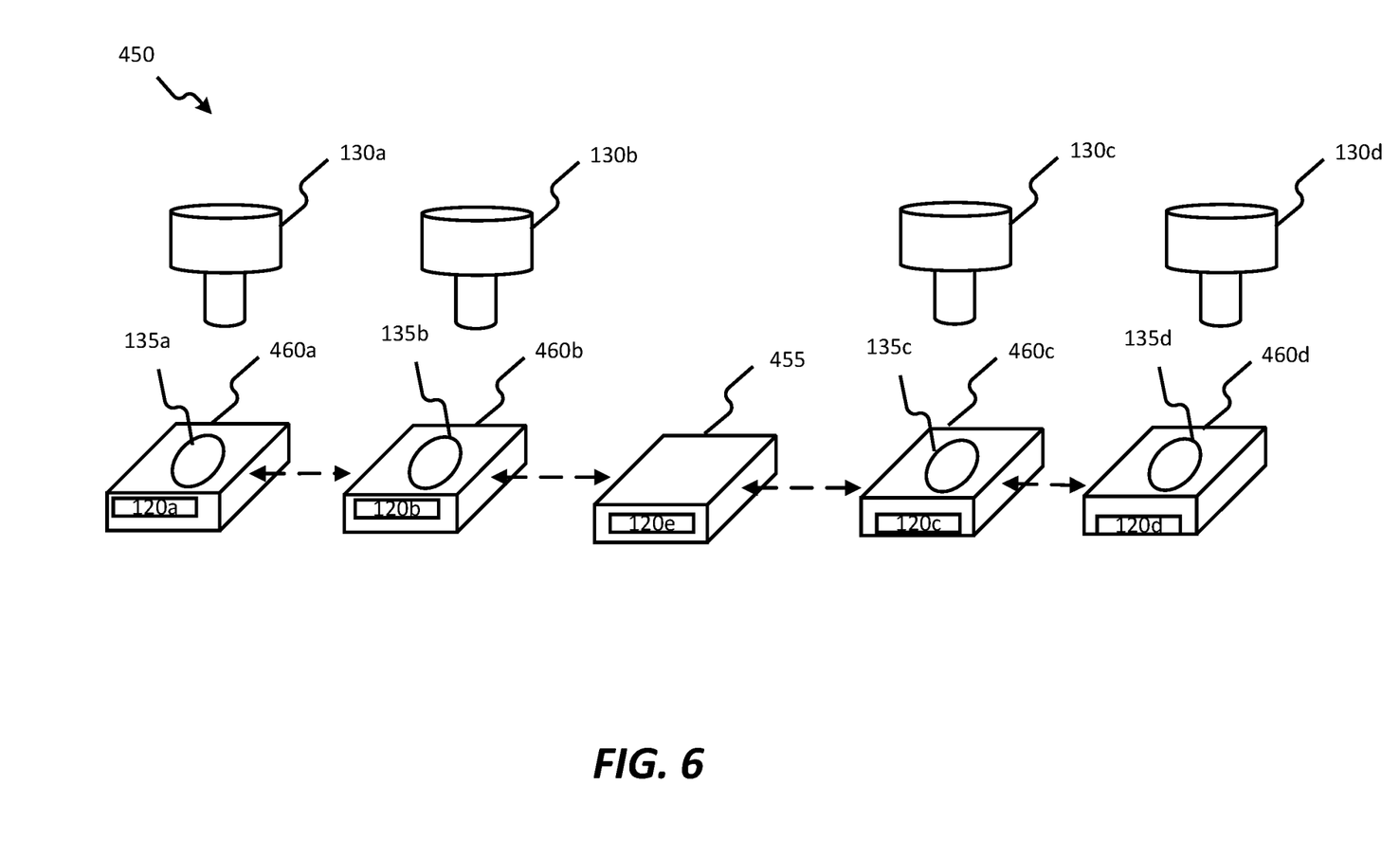
FIG. 6 is a perspective view of a charging system including one or more charging modules according to another embodiment.

FIG. 6 illustrates a charging system 450 according to another embodiment. As illustrated, rather than a housing 105 configured to receive power supply 110 and charging modules 125a-125d, charging system 450 may include a power supply 455 and charging modules 460a-460d configured to couple to each other. In such an embodiment, the power supply 455 and charging modules 460a-460d are configured to physically and/or electrically couple to each other to form the charging system 450. Thus, the power supply 455 and each charging modules 460a-460d may include physical and/or electrical couplings to physical and/or electrically couple to each other. In such an embodiment, power supply 455 may be substantially similar to and operate in a substantially similar manner as power supply 110. Additionally, in such an embodiment, charging modules 460a-460d may be substantially similar to and operate in a substantially similar manner as charging modules 125a-125d.

Figure 7:
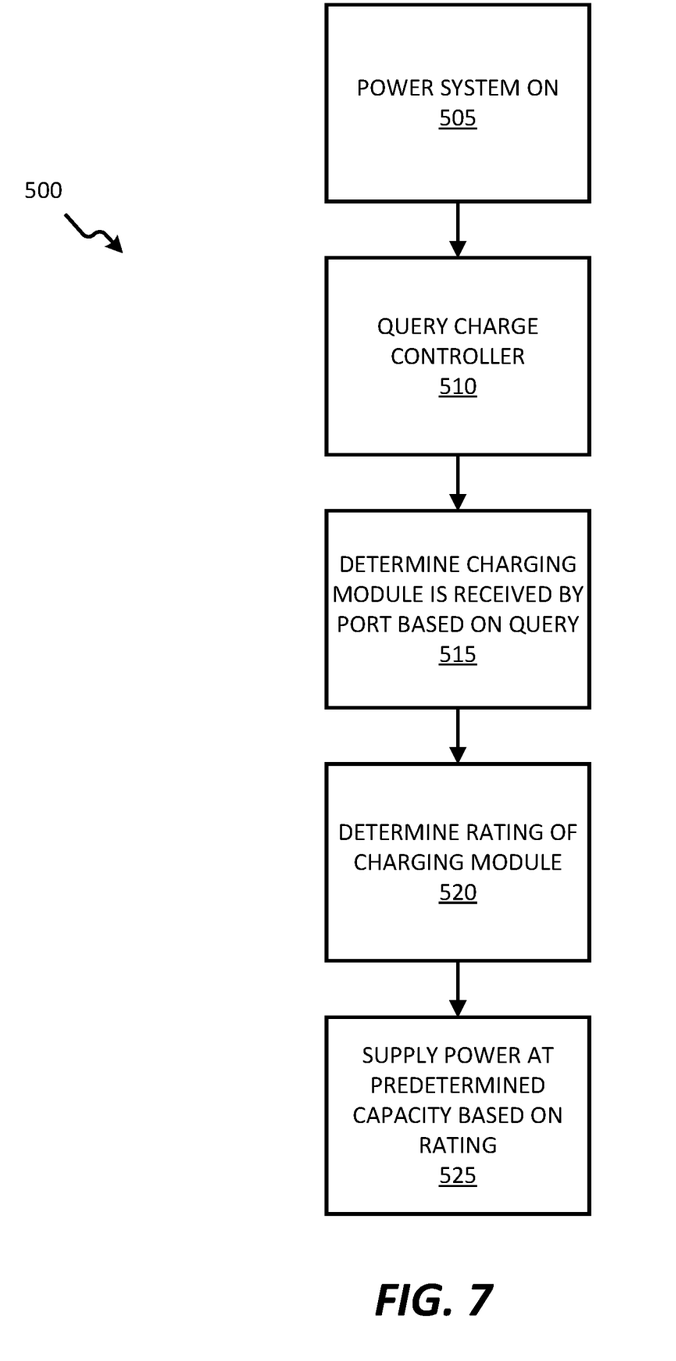
FIG. 7 is a flowchart illustrating an operation of a charging system according to some embodiments.

FIG. 7 is a flowchart illustrating an exemplary method of operation 500 of the system 100 according to some embodiments. While a particular order of processing steps, message receptions, and/or message transmissions is indicated in FIG. 7 as an example, timing and ordering of such steps, receptions, and transmissions may vary where appropriate without negating the purpose and advantages of the examples set forth in detail throughout the remainder of this disclosure. The system 100 is powered on (block 505). The power supply controller 155 queries the charge controller (for example, charge controller 160a-160d) (block 510). Based on the query at block 510, the power supply controller 155 determines that a charging module (for example, charging module 125a-125d) is received by a port (for example, port 115a-115d) (block 515).

The power supply controller 155 determines a rating (for example, a power rating) of the received charging module (block 520). Power is then supplied (for example, at a predetermined capacity) according to the rating (block 525). In some embodiments, if the rating exceeds a predetermined threshold, an overload alert is output (for example, via one or more indicators 120a-120d) to the user.

Embodiments provide, among other things, a modular charging system and method. Various features and advantages of the application are set forth in the following claims.

What is claimed is:

1. A system for charging a rechargeable power tool battery pack, the system comprising:
   a housing including a first port and a second port, the first port and the second port configured to receive a charging module and a power supply in both a first orientation and a second orientation, wherein, in the first orientation, the first port receives the power supply and the second port receives the charging module and, in the second orientation, the first port receives the charging module and the second port receives the power supply, wherein the power supply is configured to supply a charging voltage, and wherein the charging module includes a battery receptacle configured to receive the rechargeable power tool battery pack, the rechargeable power tool battery pack including a first battery characteristic; and
   a power bus within the housing, the power bus configured to provide an electrical connection between the first port and the second port and distribute the charging voltage.

2. The system of claim 1, wherein the housing further includes a third port configured to receive at least one selected from the group consisting of the power supply, the charging module, and a second charging module.

3. The system of claim 2, wherein the second charging module includes a second battery receptacle configured to receive a second rechargeable power tool battery pack having a second battery characteristic different from the first battery characteristic.

4. The system of claim 3, wherein the first battery characteristic is a first voltage of approximately 18 volts and the second battery characteristic is a second voltage of approximately 12 volts.

5. The system of claim 1, wherein the charging module further includes a charge controller configured to authenticate the rechargeable power tool battery pack before supplying charging voltage.

6. The system of claim 1, wherein the power supply includes a power supply controller, the power supply controller configured to authenticate the charging module when received by at least one of the first port and the second port.

7. The system of claim 1, wherein the housing includes an indicator.

8. The system of claim 7, wherein the indicator provides a charge status of the battery pack.

9. The system of claim 1, further comprising a communication module configured to provide an indication, via a wireless connection, to an external device.

10. The system of claim 9, wherein the indication is a system status indication.

11. A method of operating a charging system including a port configured to interchangeably receive a charging module and a power supply, the method comprising:
   detecting whether the charging module is received by the port by outputting, via a first controller of the charging system, a query to a second controller of the charging module;
   determining, based on the query to the second controller, that the charging module is received by the port;
   determining, via the first controller, a rating of the charging module; and
   supplying power to the charging module according to the rating of the charging module.

12. The method of claim 11, wherein the rating of the charging module is a power rating.

13. The method of claim 11, further comprising:
   outputting, via an indicator, an alert when the rating of the charging module is above a predetermined threshold.

14. The method of claim 11, wherein the charging module is configured to charge a battery pack.

15. The method of claim 11, wherein a capacity of the power supplied is based on the rating of the charging module.

16. A system for charging a plurality of battery packs, the system comprising:
   a housing;
   a plurality of charging modules configured to receive at least one of the plurality of battery packs;
   a power supply;
   a plurality of ports including a first port and a second port configured to receive a first charging module of the plurality of charging modules and the power supply in both a first orientation and a second orientation, wherein, in the first orientation, the first port receives the power supply and the second port receives the first charging module of the plurality of charging modules and, in the second orientation, the first port receives the first charging module and the second port receives the power supply; and
   a power bus configured to provide power from the power supply to the first charging module of the plurality of charging modules,
   wherein of the first charging module of the plurality of charging modules includes a first controller configured to control power from the power supply, and
   wherein the power supply includes a second controller configured to communicate with the first controller.

17. The system of claim 16, wherein the power supply is further configured to monitor at least one characteristic of the power bus, the at least one characteristic of the power bus including a current level, a voltage level, a power level, or a temperature.

18. The system of claim 16 further comprising:
   a plurality of mechanical components for coupling at least one of the plurality of charging modules and the power supply to the plurality of ports.

19. The system of claim 16, wherein at least one of the plurality of charging modules includes a battery pack receptacle configured to receive the at least one of the plurality of battery packs.

20. The system of claim 19, wherein the battery pack receptacle includes a mechanical component for coupling the battery pack to the battery pack receptacle.

* * * * *